(12) United States Patent
Miesch

(10) Patent No.: US 7,195,248 B1
(45) Date of Patent: Mar. 27, 2007

(54) WHEELBARROW ATTACHMENT FOR THE BACK OF THE BUCKET OF A WHEELBARROW

(76) Inventor: Gregg B. Miesch, 3394 Edgemere Dr., Rochester, NY (US) 14612

( * ) Notice: Subject to any disclaimer, the term of this patent is extended or adjusted under 35 U.S.C. 154(b) by 46 days.

(21) Appl. No.: 11/113,718

(22) Filed: Apr. 26, 2005

(51) Int. Cl.
  *B62D 51/04* (2006.01)
  *B62J 1/28* (2006.01)

(52) U.S. Cl. ............ 280/1.5; 280/125; 280/304.4; 280/47.31; 280/47.315; 280/47.32; 40/606.7; 40/59

(58) Field of Classification Search ........... 280/1.5, 280/125, 304.4, 47.31, 47.3, 15, 47.32; 40/606.07, 40/59
  See application file for complete search history.

(56) References Cited

U.S. PATENT DOCUMENTS

| 2,010,404 | A | * | 8/1935 | Lush ............ 40/611.02 |
| 2,080,332 | A | | 5/1937 | Palthe |
| 3,565,453 | A | * | 2/1971 | Del Raso et al. ......... 280/38 |
| 4,236,723 | A | | 12/1980 | Lemmon |
| 4,466,660 | A | * | 8/1984 | Mabie ............ 297/215.11 |
| 4,838,565 | A | * | 6/1989 | Douglas et al. .......... 280/1.5 |
| 5,346,232 | A | | 9/1994 | Bushon |
| 5,385,355 | A | * | 1/1995 | Hoffman ............ 280/1.5 |
| 6,508,478 | B1 | * | 1/2003 | Ortez ............ 280/47.34 |
| 6,575,483 | B1 | * | 6/2003 | Davis ............ 280/63 |
| 6,659,547 | B2 | * | 12/2003 | Petersen ............ 297/215.1 |

* cited by examiner

*Primary Examiner*—Lesley D. Morris
*Assistant Examiner*—Marlon Arce-Diaz
(74) *Attorney, Agent, or Firm*—Crossley Patent Law; Mark A. Crossley

(57) ABSTRACT

An wheelbarrow attachment for a typical wheelbarrow, the attachment removably fitting over the lip and bucket of the back of the wheelbarrow and therefrom extending upward and backward from the rear of the bucket. The u-channels fitting the bucket are connectively braced. Inner uprights attach to the u-channels and are adjustably fitted for height, and fore and aft adjustment of a padded cross plate connecting the inner uprights. A user braces and pushes with his/her body, offering greater force for propelling the wheelbarrow and greater stability in handling a loaded wheelbarrow.

11 Claims, 5 Drawing Sheets

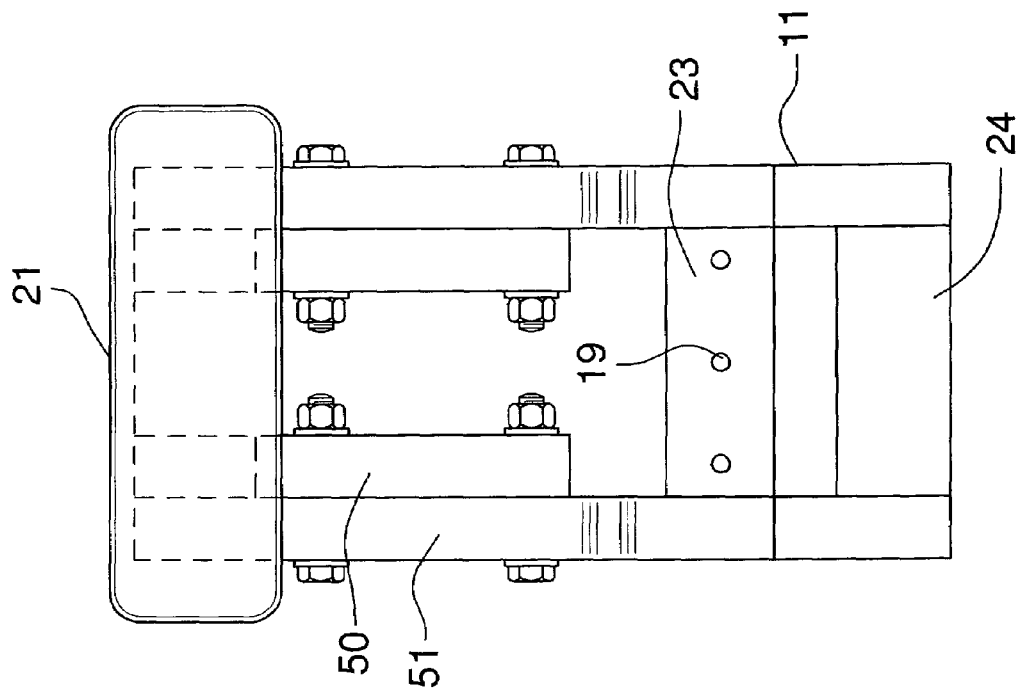
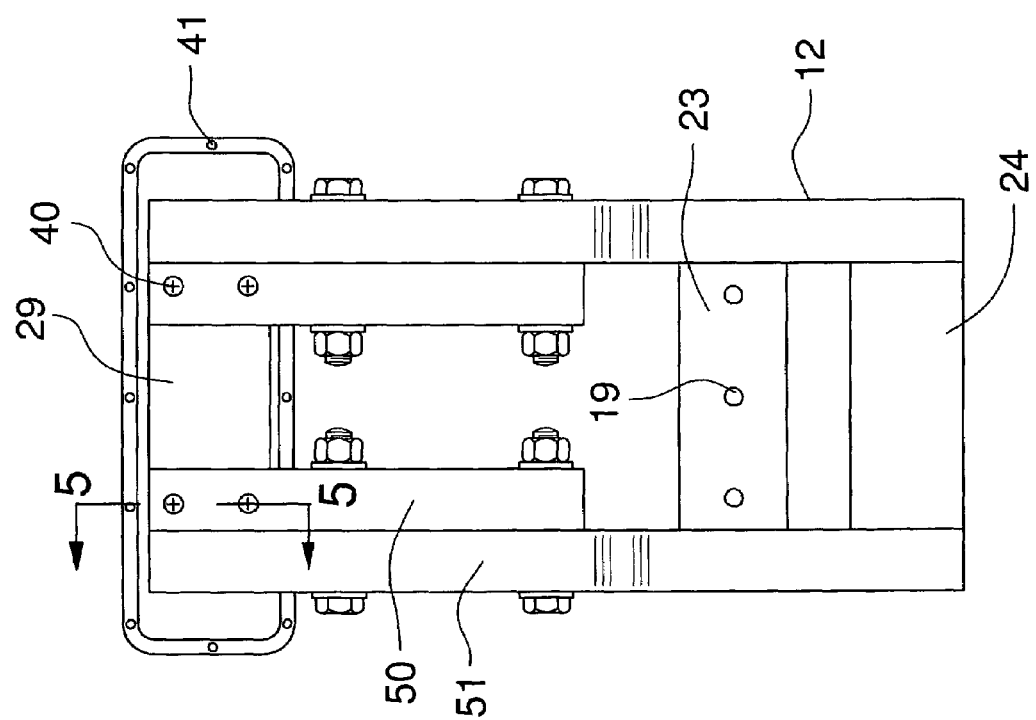

WHEELBARROW ATTACHMENT FOR THE BACK OF THE BUCKET OF A WHEELBARROW

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

1. Field of the Invention

The present invention relates to an accessory for a wheelbarrow and more specifically to a wheelbarrow attachment for the back of the bucket of the wheelbarrow for aiding a user can in supporting and propelling a wheelbarrow.

2. Description of the Prior Art

Wheelbarrows and the difficulty of using them are familiar to the public and professional sectors. While the prior art teaches methods of improving wheelbarrows, none addresses the problems solved by the present invention. By way of example:

U.S. Pat. No. 5,436,232 to Bushon, Sep. 13, 1994 discloses a cross member mounted to and extending between the handleshafts of a wheelbarrow. The device does not address the issues of stability, as does the present invention, and it does not allow the involvement of the upper body for stability and force application. As such, it differs greatly from the present invention.

U.S. Pat. No. 4,236,723 to Lemmon, Dec. 2, 1980 discloses a pull cart for attaching to a user's hips. The invention does not resemble a wheelbarrow, or a wheelbarrow attachment.

U.S. Pat. No. 2,080,332 to Palthe, May 11, 1937 discloses a wheelbarrow which relocates the wheel. While an extension is shown against which a user may push, the wheelbarrow and its components differ greatly from the present invention and from those wheelbarrows currently in use to which the present invention attaches.

While the above-described devices fulfill their respective and particular objects and requirements, they do not describe a wheelbarrow attachment that provides for the advantages of the present invention, therefore, a need exists for an improved wheelbarrow attachment, particularly one that fits the back of the bucket of the wheelbarrow and aids in supporting and propelling a wheelbarrow by utilizing the upper body of a user. In this respect, the present invention substantially departs from the conventional concepts and designs of the prior art.

SUMMARY OF THE INVENTION

In view of the foregoing disadvantages inherent in the known types of wheelbarrow devices now present in the prior art, the wheelbarrow attachment for the back of the bucket of the wheelbarrow overcomes the above-mentioned disadvantages and drawbacks of the prior art. As such, the general purpose of the wheelbarrow attachment for the back of the bucket of the wheelbarrow, described subsequently in greater detail, is to provide a wheelbarrow attachment which has all of the advantages of the prior art mentioned heretofore and many novel features that result in an improved wheelbarrow attachment which is not anticipated, rendered obvious, suggested, or even implied by the prior art, either alone or in combination thereof.

To accomplish this, the wheelbarrow attachment is removably attached to a typical wheelbarrow and affords a user the ability to stabilize a loaded wheelbarrow. The wheelbarrow attachment also provides for a user to utilize his or her chest to propel the wheelbarrow, thereby exerting greater propulsion force than would otherwise be exerted. Stability and greater force application result in a wheelbarrow that is much easier to move, especially across soft or rough ground, when heavily loaded, and/or up an incline. Further, by utilizing a user's chest, wrist strain is greatly reduced. Wrist strain is of considerable concern in utilizing a wheelbarrow. The wheelbarrow attachment is practical for commercial or home use and significantly increases the load that a user can stabilize and transport with a typical wheelbarrow.

The wheelbarrow attachment is comprised of inner and outer uprights. The inner uprights are further comprised of transverses which extend horizontally backward from the inner uprights and terminate in a cross plate. A pad base is mounted to the cross plate and a cushioning pad, preferably covered, is mounted to the pad base. The inner uprights are adjustably attached to the outer uprights. Outer uprights terminate downwardly in u-shaped channels. A foreleg and an aft leg comprise the u-shaped channels. An inner brace connects one foreleg to the other, and an outer brace connects one aft leg to the other. U-shaped channels are thereby stabilized and also fitted around a back and lip of a typical wheelbarrow bucket. A spacer is provided to snugly fit between the aft legs and an outer brace, just below the lip of the wheelbarrow. The spacer further stabilizes the attachment of the invention to the wheelbarrow.

The adjustable attachment of the inner and outer uprights is provided by equidistantly spaced holes. Holes are in the upper extremity of the outer uprights and the lower extremity of the inner uprights. Holes are positioned such that the inner uprights can be adjustably fastened, via typical bolts, to the outer uprights. Adjustability is provided for height and for fore and aft positioning of the transverses. As the transverses move, so moves the pad, providing adjustment for any size user or virtually any situation encountered.

Preferably, the wheelbarrow attachment is made substantially of metal or of rugged plastic; however, further embodiments utilize composites and alloys. The pad is upholstered in typical style with vinyl or the like. A further embodiment comprises a one piece molded pad bonded to the cross plate, a practice familiar to those skilled in the art of construction equipment and the like.

Thus has been broadly outlined the more important features of the wheelbarrow attachment so that the detailed description thereof that follows may be better understood and in order that the present contribution to the art may be better appreciated. Numerous objects, features and advantages of the wheelbarrow attachment will be readily apparent to those of ordinary skill in the art upon reading the following detailed description of presently preferred, but nonetheless illustrative, embodiments of the wheelbarrow attachment when taken in conjunction with the accompanying drawings. In this respect, before explaining the current embodiments of the wheelbarrow attachment in detail, it is to be understood that the invention is not limited in its application to the details of construction and arrangements of the components set forth in the following description or illustration. The invention is capable of other embodiments and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the wheelbarrow attachment.

It is therefore important that the claims be regarded as including such equivalent constructions insofar as they do not depart from the spirit and scope of the present invention.

A primary object, then, of the wheelbarrow attachment is to provide for additional force application to a typical wheelbarrow and its load.

An added object of the wheelbarrow attachment is to provide greater stability in handling a loaded wheelbarrow.

Further, it is an object of the wheelbarrow attachment to reduce strain in handling a typical loaded wheelbarrow.

And, it is an object of the wheelbarrow attachment to provide for easy attachment to a typical wheelbarrow.

Further, it is an object of the wheelbarrow attachment to provide height and angle of pad adjustment.

These together with additional objects of the wheelbarrow attachment, along with various novel features that characterize the invention are particularly pointed out in the claims forming a part of this disclosure.

For better understanding of the wheelbarrow attachment, its operating advantages and specific objects attained by its uses, refer to the accompanying drawings and description.

BRIEF DESCRIPTION OF THE DRAWINGS

FIG. 3 is a front view of the wheelbarrow attachment.

FIG. 4 is a rear view of the wheelbarrow attachment.

DETAILED DESCRIPTION OF THE PREFERRED EMBODIMENT

With reference now to the drawings, and in particular FIGS. 1 through 6 thereof, the preferred embodiment of the wheelbarrow attachment employing the principles and concepts of the present invention and generally designated by the reference number 10 will be described.

Figure 1:
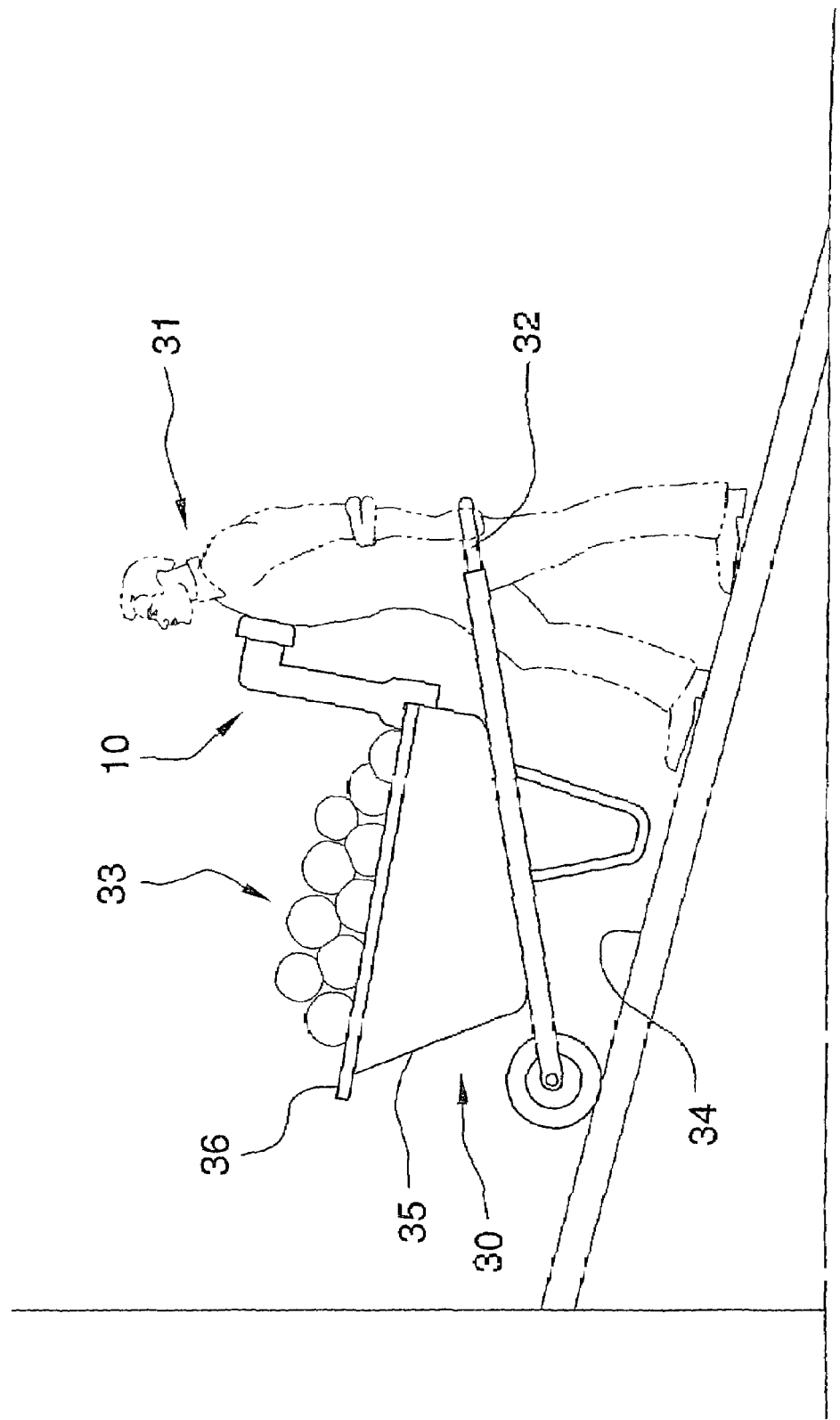
FIG. 1 is a lateral view of the wheelbarrow attachment in use.

Referring to FIG. 1, wheelbarrow attachment 10 is attached to typical wheelbarrow 30. Wheelbarrow 30 is filled with load 33 and in transit up incline 34. User 31 grasps typical handles 32 and further leverages and stabilizes wheelbarrow 30 by pushing against attachment 10 with his chest.

Figure 2:
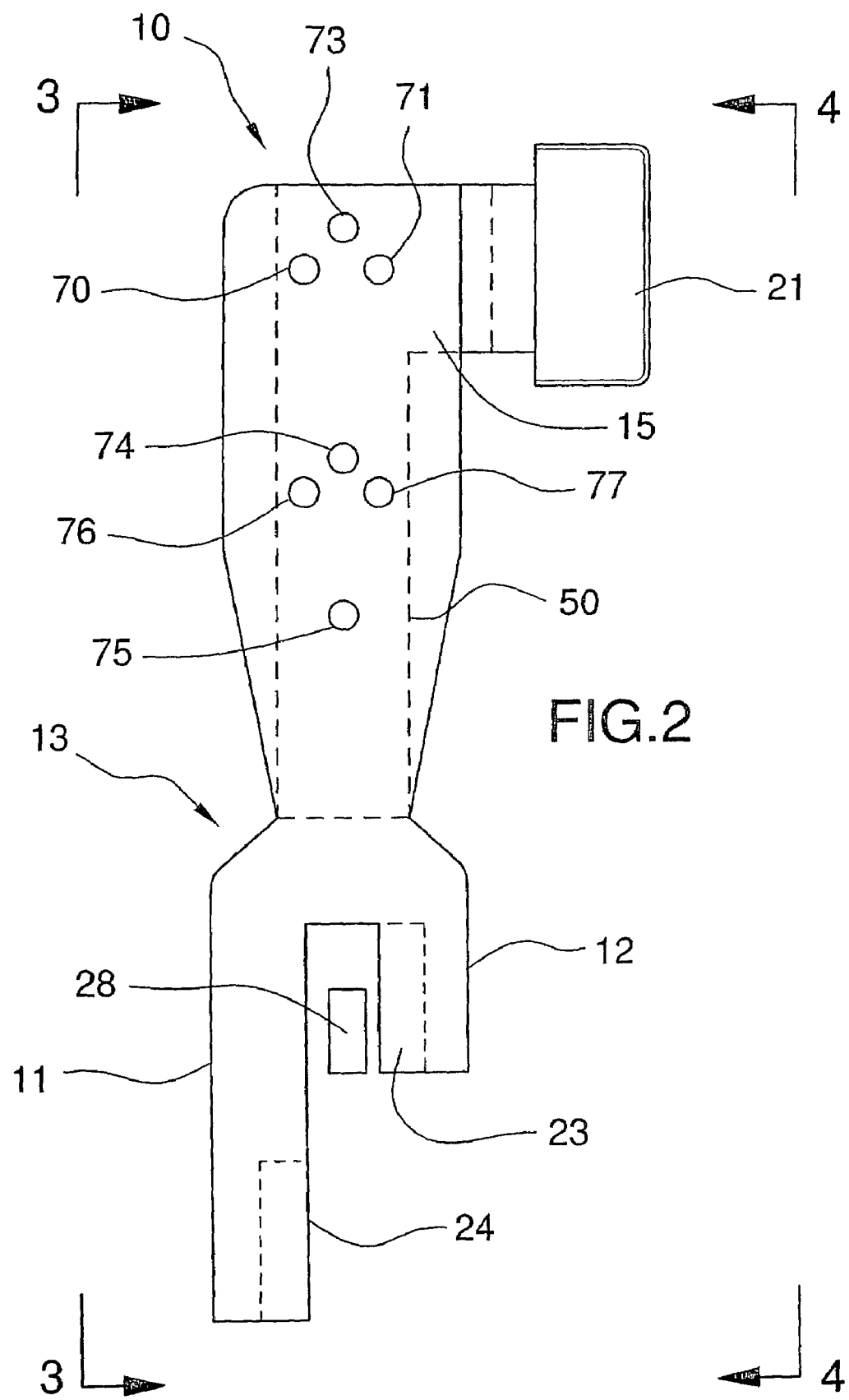
FIG. 2 is a lateral view of the wheelbarrow attachment.

Referring to FIGS. 2, 3, and 4, the attachment 10 for a typical wheelbarrow 30 comprises two parallelepiped inner uprights 50 and two parallelepiped outer uprights 51. Each upright 51 terminates downwardly at a u-shaped channel 13 (FIG. 2). Each u-shaped channel 13 comprises a foreleg 11 disposed forwardly and downwardly for fitting within the rearward section of bucket 35 of wheelbarrow 30. Each unshaped channel 13 further comprises a shorter aft leg 12 for fitting without and rearward of the rearward section of bucket 35. A horizontally disposed parallelepiped outer brace connects the aft legs 12 to each other. Parallelepiped spacer 28 fits horizontally between outer brace 23 and bucket 35, just below lip 36. Spacer 28 is fastened to outer brace 23 via screws (not shown) through brace holes 19. Parallelepiped inner brace 24 fits transversely within the back of bucket 35 and connects forelegs 11 together, thereby further supporting invention 10 against and within bucket 35.

Figure 5:
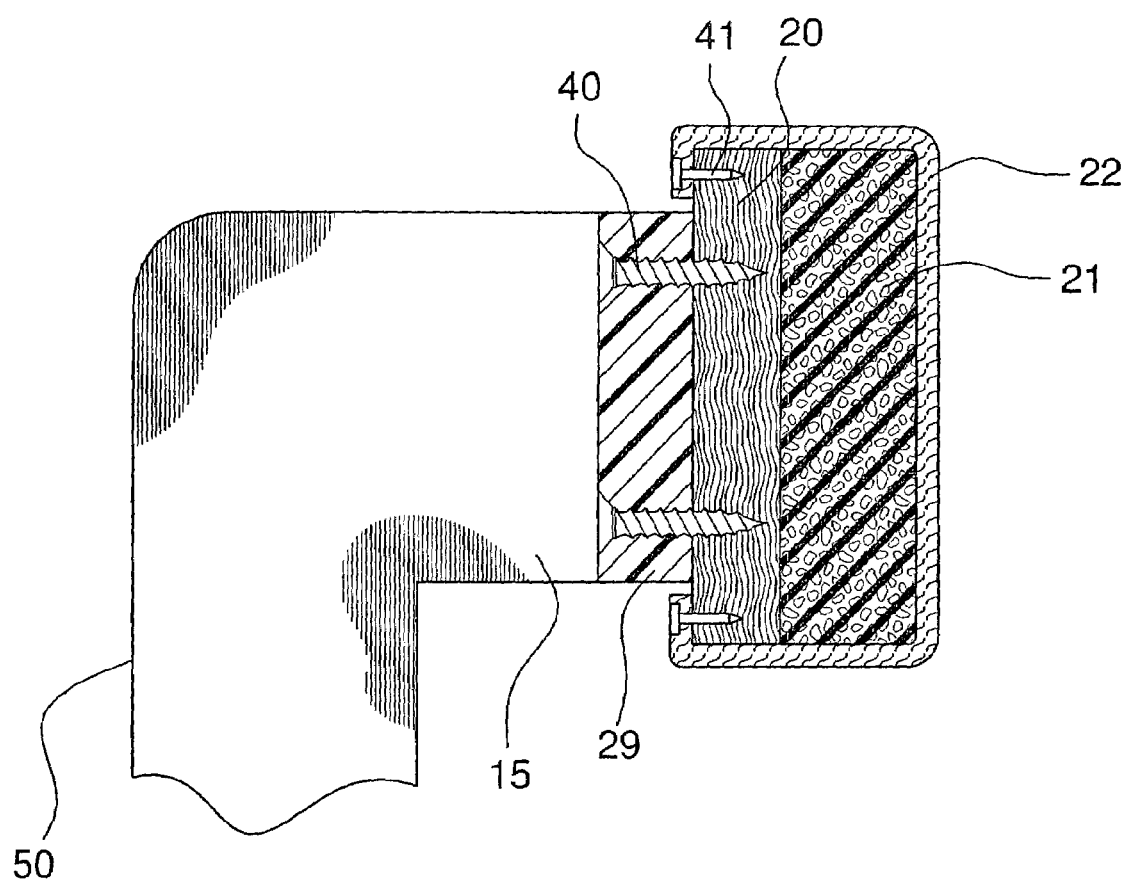
FIG. 5 is a lateral cross sectional view of the pad, cross plate and related components of the wheelbarrow attachment.
Figure 6:
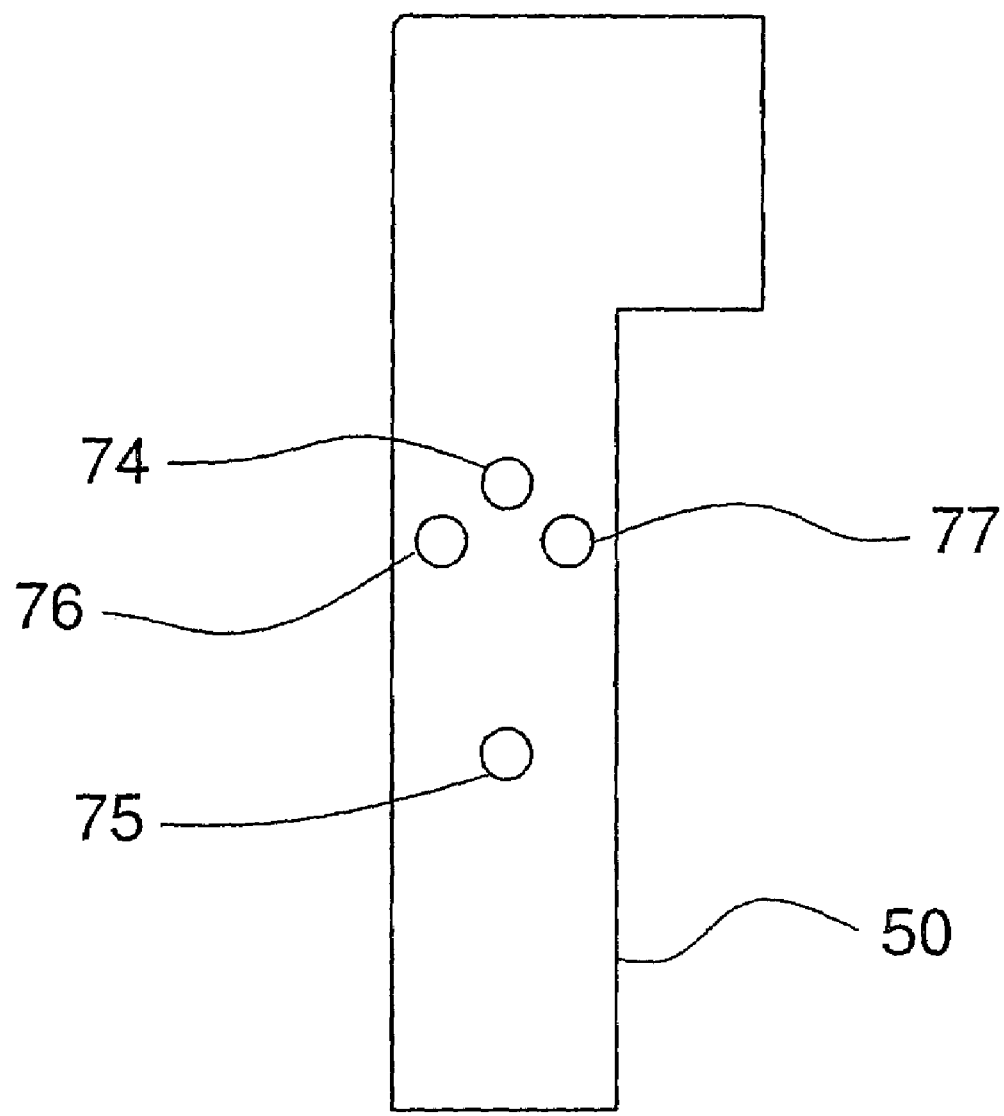
FIG. 6 is a lateral view of an inner upright, illustrating adjustment holes.

Referring to FIGS. 2, 5, and 6, transverses 15 are continuous with and extend horizontally backward from upper ends of inner uprights 50, in a plane generally perpendicular to inner uprights 50. Inner uprights 50 adjustably fit medially and against outer uprights 51. Outer uprights 51 further comprise outer pivot hole 70, outer pivot hole 71, outer pivot hole 76, and outer pivot hole 77. Pivot hole 70 is forwardly uppermost and through both sides of inner upright 50. Outer pivot hole 76 is below outer pivot hole 70. Outer uprights 51 further comprise center hole 73, center hole 74, and center hole 75. Center hole 73 is centered and uppermost. Center hole 74 is below center hole 73. Center hole 75 is below center hole 74. Outer pivot hole 71 is rearwardly upmost, and outer pivot hole 77 is below outer pivot hole 71. Inner uprights 50 are comprised of inner pivot hole 60, inner pivot hole 61, center hole 63 and center hole 64. Inner pivot hole 60, inner pivot hole 61, center hole 63, and center hole 64 correspond with holes of outer uprights 51. For explanation, pivot hole numbers on opposite uprights are reversed such that the same paired number sequences are used for each side, when height and fore and aft movement of inner uprights 50 are adjusted. For highest adjustment of inner uprights 50, typical bolts are inserted into outer holes 73 of outer upright 51 and through inner holes 63 of inner upright 50. Bolts are also inserted through center hole 74 and center hole 64, thereby further supporting inner uprights 50. Bolts are secured by typical nuts on the inside of inner uprights 50.

To set inner uprights 50 to lowest position, bolts are inserted into center holes 74 and through center holes 63. Supporting bolts are inserted through center holes 75 and center holes 64.

Fore and aft pivotal adjustment of inner uprights 50 is also provided via corresponding hole selections in inner uprights 50 and outer uprights 51. Pivoting inner uprights 50 forward consequently moves pad 21 forward. Pivoting inner uprights 50 backward pivots pad 21 backward. At any point in pivoting inner uprights 50 or raising and lowering inner uprights 50, a variety of paired positioned holes are be chosen. Choosing two pair of corresponding holes per upright provides stability and rigidity for inner uprights 50 over choosing only one pair of corresponding holes.

Referring again to FIG. 5, transverses 15 terminate rearwardly at the attachment of horizontal cross plate 29. Cross plate 29 thereby locates and supports transverses 15 and hence inner uprights 50. Cross plate 29 provides for fastening of pad base 20 to cross plate 29 via typical fasteners 40. Pad base 20 is fitted with pad 21 facing rearwardly. Pad 21 is outwardly surrounded by pad cover 22. Pad cover 22 extends around the forward edges of base 20. Pad cover 22 is fastened to the forward side of base 20 via typical tacks 41 passing through pad cover 22 into base 20.

In use, outer uprights 51 of the wheelbarrow attachment 10 are secured as chosen to the inner uprights 50. Inner uprights 50 are placed such that pad 21 faces user 31. U-shaped channels 13 are placed over lip 36 of typical wheelbarrow 30 and abutted downwardly against lip 36.

Forelegs 11 are within bucket 35. Outer uprights 51 are centered between handles 32. Spacer 28 is inserted between outer brace 23 and back of bucket 35. Spacer 28 is inserted just below the lip 36 of bucket 35. Brace holes 19 in brace 23 are utilized for inserting screws through brace holes 19 and into spacer 28. Invention 10 is thereby firmly secured to bucket 35 of typical wheelbarrow 30.

As above-instructed, user 31 selectively further adjusts height and angle of inner uprights 50 by choosing to bolt through the various hole combinations. User 31 loads wheelbarrow as desired. User 31 lifts wheelbarrow 30 by grasping handles 32. User 31 leans his/her chest against pad 21, thereby further supporting wheelbarrow 30. User 31 pushes with chest to propel wheelbarrow 30 up incline 34.

With respect to the above description then, it is to be realized that the optimum dimensional relationships for the parts of the wheelbarrow attachment, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An attachment device, the attachment removably fitting over the lip of the back of a wheelbarrow, the attachment comprising:
    a pair of parallelepiped uprights, each of the uprights comprising a u-shaped channel at a lower end;
    a transversely mounted inner brace connecting a lower region of a foreleg of each of the u-shaped channels;
    a transversely mounted outer brace connecting a shorter aft leg of each of the u-shaped channels;
    a spacer fitting between the outer brace and the back of the bucket of the typical wheelbarrow;
    fastening means fastening the spacer to the outer brace;
    a transverse at an upper end of each of the uprights, the transverse extending horizontally backward from the upper end of the upright, the transverses terminating in a cross plate, the cross plate further comprises a rearward facing pad, the cross plate connecting a rearward terminus of each of the transverses.

2. The invention in claim 1 wherein each of the uprights is divided into an inner upright and an outer upright, the inner upright further comprising the transverse and cross plate, the inner upright extending downward from the transverse, the outer upright comprising the U-shaped channel, the outer upright extending upward from the u-shaped channel, the inner
upright removably fitting medially and against the outer upright, the inner and outer uprights further comprising a plurality of adjusting holes and fastening bolts whereby height and angular adjustments of the inner uprights in relation to the outer uprights is accomplished via the adjusting holes and the bolts.

3. The invention in claim 2 wherein the pad is removably fastened to the cross plate.

4. The invention in claim 3 wherein the wheelbarrow attachment is about 18 inches wide and about 12 inches in depth.

5. The invention in claim 4 wherein the cross plate and the pad are about 8 inches high, 2 inches thick, and 18 inches wide.

6. The invention in claim 5 wherein the spacer is about 1¾ inches thick, 2½ inches high, and 14 inches long.

7. An attachment device, the attachment removably fitting over the lip of the back of a wheelbarrow, the attachment comprising:
    a pair of outer uprights, each of the outer uprights comprising a u-shaped channel at a lower end, a transversely mounted inner brace connecting a foreleg of each of the u-shaped channels, a transversely mounted outer brace connecting a shorter aft leg of each of the u-shaped channels;
    a spacer fastening to the outer brace and fitting against the back of the bucket of the typical wheelbarrow; a pair of inner uprights attaching medially to the outer uprights, each inner upright continuing into a perpendicular transverse, the transverse extending horizontally backward from an upper end of the upright, the transverse terminating in a cross plate connecting the rearward terminus of each of the transverses, wherein the cross is rearwardly fitted with a pad.

8. The invention in claim 7 wherein the pad is upholstered.

9. The invention in claim 8 wherein the inner uprights and the outer
uprights are removably and adjustably attached, the adjustable attachment comprising a plurality of spaced apart holes in the outer uprights and corresponding holes in the inner uprights, the removable and adjustable attachment further comprising typical bolts and nuts.

10. An attachment device, the attachment removably fitting over the lip of the back of a wheelbarrow, the attachment comprising:
    a pair of outer uprights, each of the outer uprights comprising a u-shaped channel at a lower end, each u-shaped channel comprising a foreleg and an aft leg, the fore legs of the u-shaped channels connected by a transversely mounted inner brace, the aft legs of the u-shaped channels connected by a transversely mounted outer brace;
    a spacer fitting between the outer brace and the back of the bucket of the wheelbarrow;
    a pair of inner uprights removably and adjustably attaching medially to the outer uprights, each of the inner uprights continuing into a perpendicular transverse, the transverse extending horizontally backward from an upper end of the uprights, the transverses terminating in a cross plate connecting the rearward terminus of each of the transverses, the cross plate rearwardly attached with a pad, the removable and adjustable attachment comprising a plurality of spaced apart holes in the outer uprights and corresponding holes in the inner uprights, the holes utilized to secure the inner and outer uprights with typical bolts and nuts.

11. The invention in claim 10 wherein the pad is upholstered.

* * * * *